United States Patent [19]

Wurst et al.

[11] 4,073,203
[45] Feb. 14, 1978

[54] ELECTRONIC TRANSMISSION GEAR CHANGE CONTROL SYSTEM

[75] Inventors: Bert Wurst, Moglingen; Harald Vogt, Schwieberdingen, both of Germany

[73] Assignee: Robert Bosch GmbH, Stuttgart, Germany

[21] Appl. No.: 621,513

[22] Filed: Oct. 10, 1975

[30] Foreign Application Priority Data

Oct. 11, 1974 Germany .............................. 2448540

[51] Int. Cl.$^2$ ............................................. B60K 41/18
[52] U.S. Cl. ............................................. 74/866; 74/869
[58] Field of Search .................. 74/866, 867, 868, 869

[56] References Cited

U.S. PATENT DOCUMENTS

| | | | |
|---|---|---|---|
| 3,750,495 | 8/1973 | Ito et al. ................... | 74/866 |
| 3,776,048 | 12/1973 | Enomoto et al. ........... | 74/866 |
| 3,813,964 | 6/1974 | Ichimura et al. ........... | 74/866 |
| 3,885,472 | 5/1975 | Wakamatsu et al. ....... | 74/866 |
| 3,938,409 | 2/1976 | Uozumi ..................... | 74/866 |
| 3,939,738 | 2/1976 | Adey et al. ................ | 74/866 X |

*Primary Examiner*—James F. Coan
*Attorney, Agent, or Firm*—Flynn & Frishauf

[57] ABSTRACT

To provide for precise shifting of gears in automatic transmissions in dependence on vehicle speed and loading on the engine, a speed signal and a throttle position signal are applied to separate control stages one to control up-shifting and the other to control down-shifting; further, a separate kick-down switch is provided for rapid down-shifting. The control stages are so arranged that up-shifting is commanded in accordance with vehicle operating characteristics, but down-shifting is commanded only with a lag, or hysteresis, with respect to the vehicle speed, to prevent excessive shifting of the transmission. The shift control circuits may be either separate trigger circuits controlling up-shifting and down-shifting of the respective gear ranges, or may be separate networks processing the respective input signals (speed, engine loading) and providing output control signals to a shift control trigger circuit.

32 Claims, 18 Drawing Figures

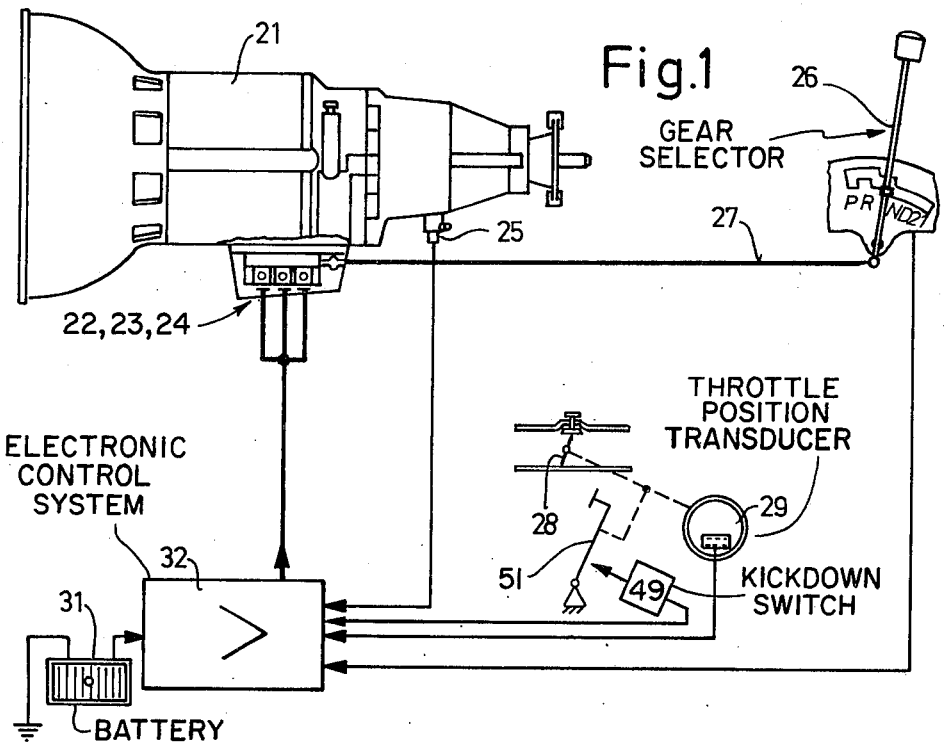

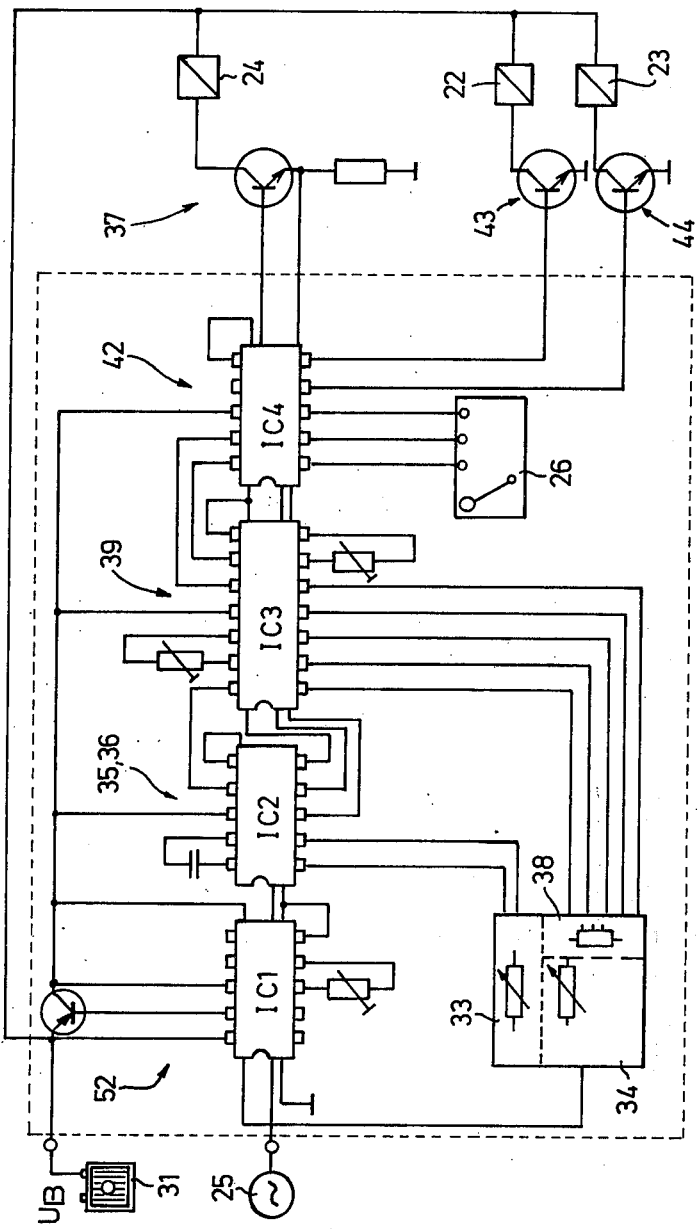

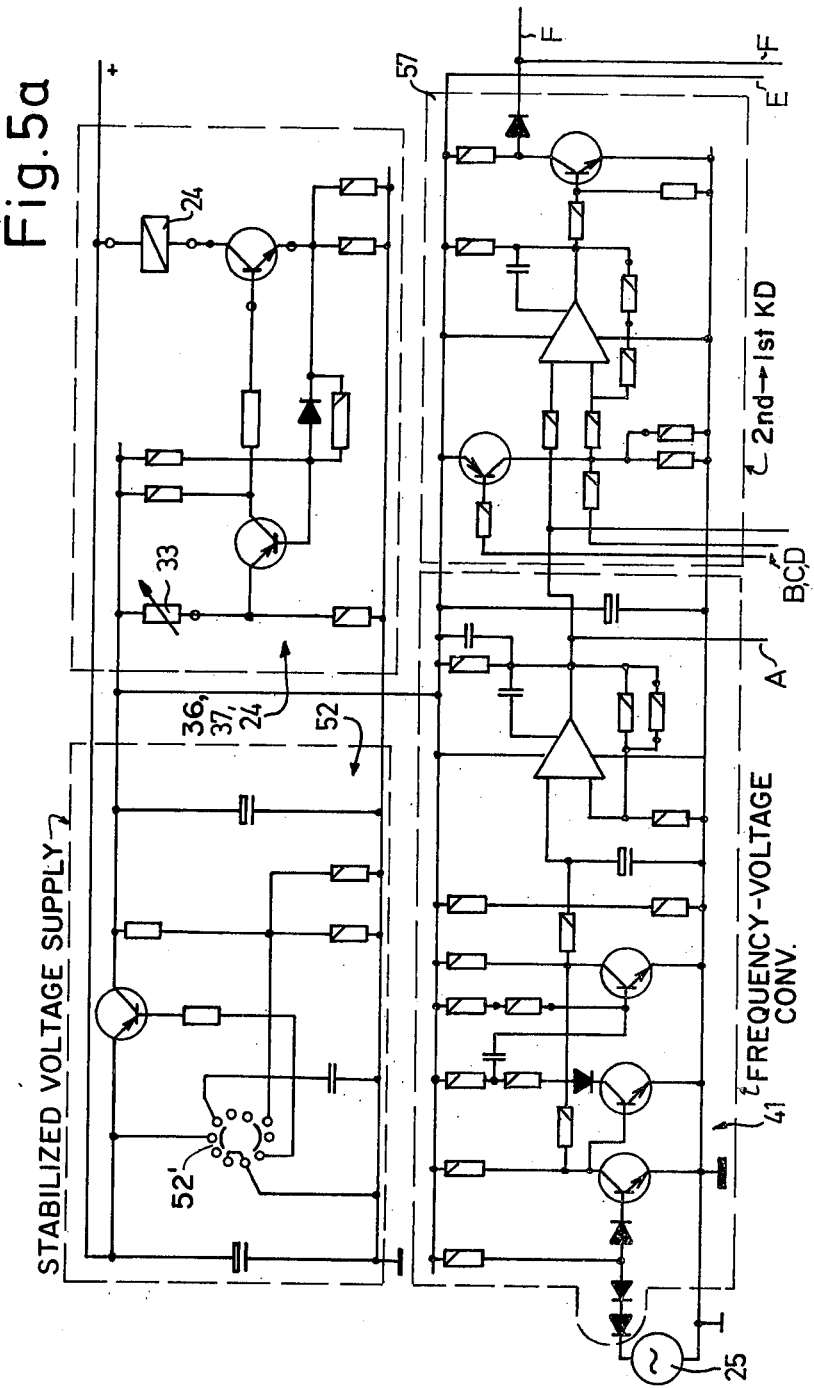

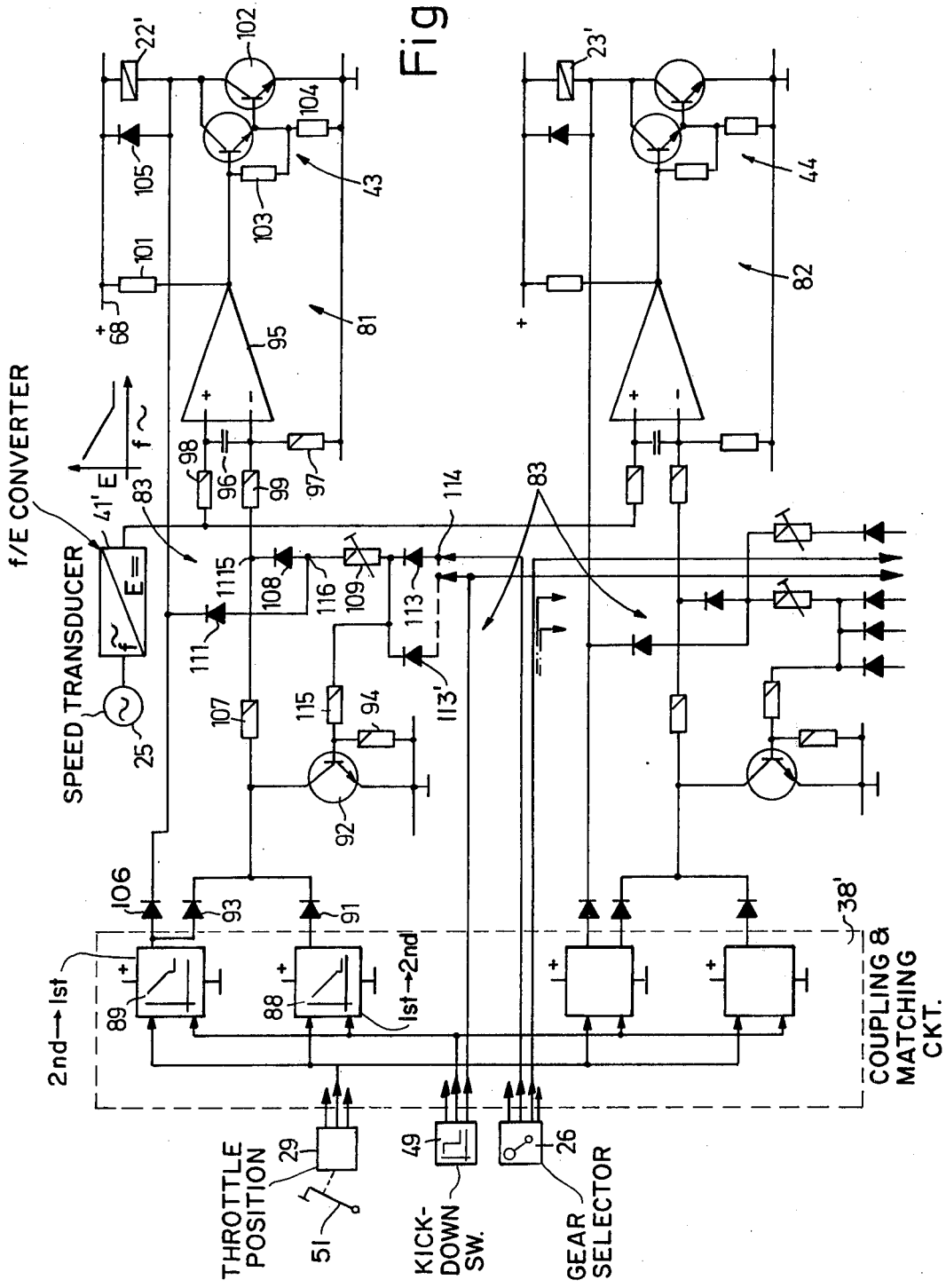

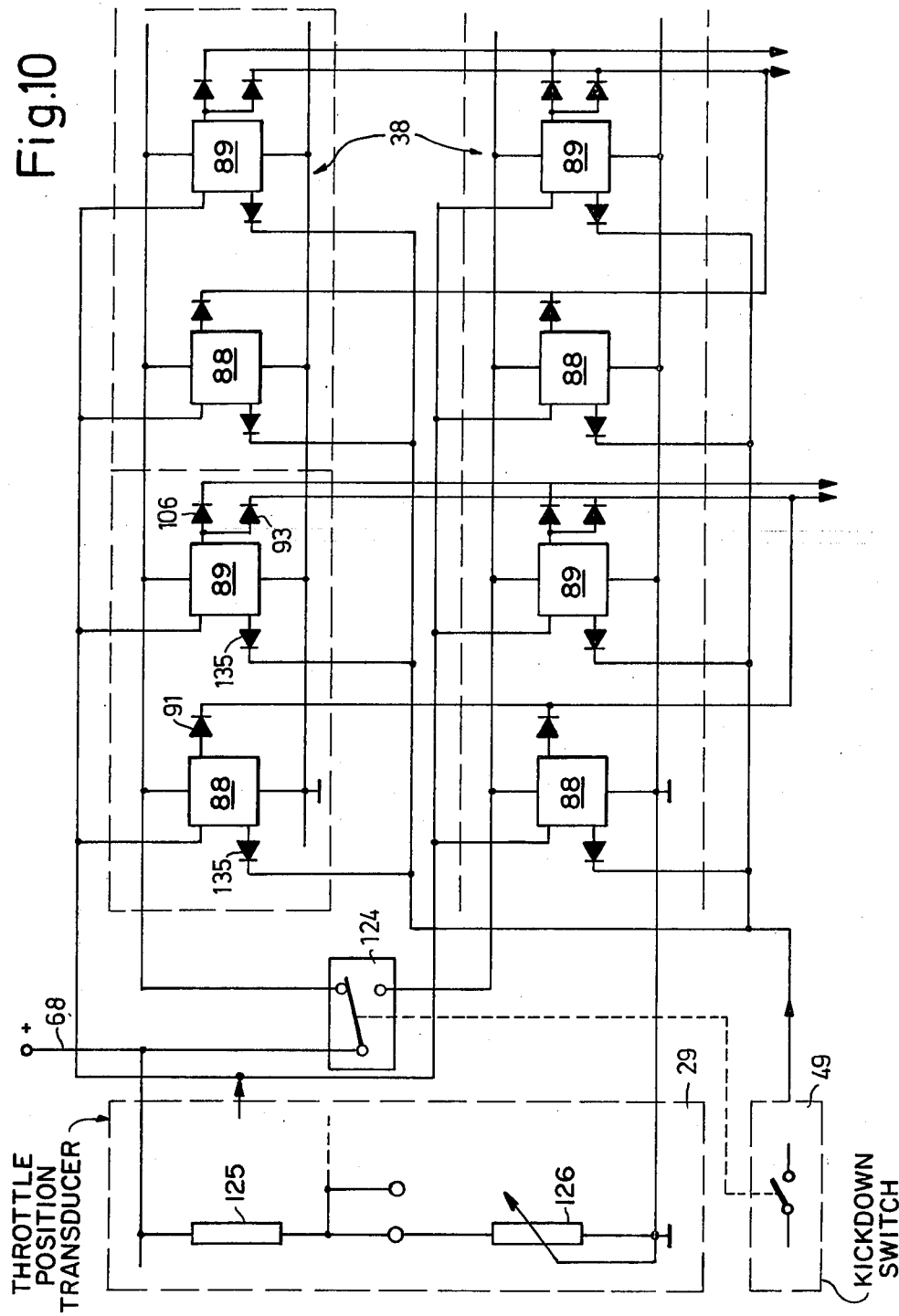

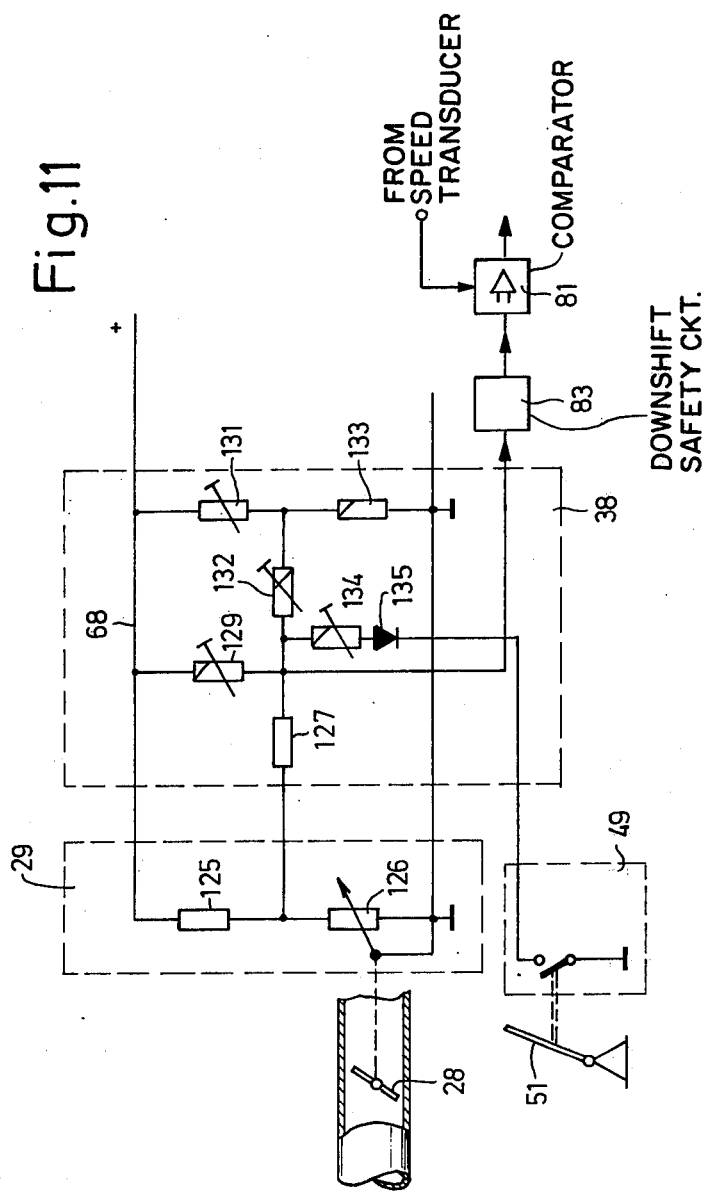

ELECTRONIC TRANSMISSION GEAR CHANGE CONTROL SYSTEM

The present invention relates to an electronic control system to control gear position and gear changes of automatic speed change transmissions to match output power and output speed of the transmission to load requirements and commanded operating conditions, and more particularly to control of automatic transmissions in automative vehicles operated by internal combustion engines.

Various types of automatic transmissions for automative vehicles have been proposed. Such automatic transmissions frequently include a planetary gear drive, the respective engagement of the gears of which controls the relationship of input speed to output speed of the transmission. The gear ratio is switched by selectively engaging, or braking, or locking the sun gear, the planet gears, or the planet ring of the planetary drive. Locking, or braking is effected by means of hydraulically operated clutches or brakes, which may be brake bands. A selected gear is engaged by selective braking of components of the transmission.

Electronic control for such transmission is increasing. The electronic control permits versatility but must meet a number of requirements. One of the requirements is that the control should operate such that change in gear ratios, that is, change in gear from one gear range to another should be effected essentially without jolts, or noticeable gear jumps, so that the operator, and passengers in the vehicle are not jarred upon changing of a gear range. Additionally, the system must be reliable and fail-safe; upon breakage of a cable, upon failure of an electronic component, or upon other defects, operation of the vehicle should continue so that dangerous operating conditions are excluded; additionally, it should be possible to operate the vehicle even with disabled transmission control so that the vehicle can be driven at least to the nearest service or repair station. Another desirable requirement is an interlock to prevent the driver or operator from engaging a gear which is excessively low with respect to then existing vehicle speed or engine speed; it should be impossible for the driver to engage reverse unless the vehicle is stopped.

An additional problem in connection with automatic transmissions is the gear change or switching program itself, which must be matched to the motor load characteristics; the system should, preferably, be easily adapted to a variety of motor characteristics, so that it has versatile application. The switching program must additionally have a certain hysteresis between the various gear ranges, which hysteresis should be built into the control system to prevent excessive gear changing of the mechanism itself.

It is an object of the present invention to provide an electronic gear and transmission control system, particularly for automotive use, which can easily be constructed with integrated circuit components, or with discrete components; which is reliable, and has the fail-safe and interlock features which contribute to reliable and safe operation of the vehicle.

SUBJECT MATTER OF THE PRESENT INVENTION

Briefly, each one of the directions of gear switching or gear changing operations - that is, gear change from first to second, second to third gear; and gear change from third to second, and second to first gear, for example, as well as neutral and "reverse gear position--has a separate control for upshift, i.e., to lower speed ranges. The control means preferably are" individual flip-flop stages, individually controlled from suitable parameter data derived from the speed of the vehicle and throttle position, for example.

The system in accordance with the present invention permits individual matching of the load characteristics of the engine, in relationship to the vehicle for the various gear ranges themselves by using simple matching and coupling circuits. The selection of the gear change program is completely up to the designer and can readily be matched to vehicle and engine characteristics. The switching characteristics may have curves of positive slope. Switching hystereses - that is, differences in speed upon upshifting and downshifting between the same gears can be individually selected. Kick-down switching positions, for rapid acceleration, and associated hysteresis effects can be individually adjusted and matched to operating requirements, and to the individual gear ranges being changed.

The coupling and matching circuits which control the individual trigger circuits, or flip-flops which, in turn, control the valves which operate the gear changing brakes and clutches may consist of resistance networks. Adjustment of the switching points of the trigger circuits with respect to no-load or idling, normal loading, full loading, or kick-down switching positions is thus easily possible. These circuits can be constructed both in thick-film as well as in thin-film technology; when made by thick-film technology, the matching and coupling network can easily be combined on a single substrate chip with load transducer circuitry. The choice of the signals controlling gear range changing can be freely determined. Signals can be derived representative of throttle position, or vehicle speed, or both; and one or both signals may be applied to one or two matching and coupling networks which control the upward and downward shifting of the gear ranges, by controlling the separate gear change trigger circuits.

The invention will be described by way of example with reference to the accompanying drawings, wherein:

FIG. 1 is a highly schematic illustration of an automatic transmission and the control system and illustrating the association of the control system in accordance with the present invention with such an automatic transmission;

FIG. 2 is a schematic simplified block circuit diagram of the control system in accordance with the present invention;

FIG. 4 illustrates how the circuit can be constructed as an integrated circuit;

Figure 3:
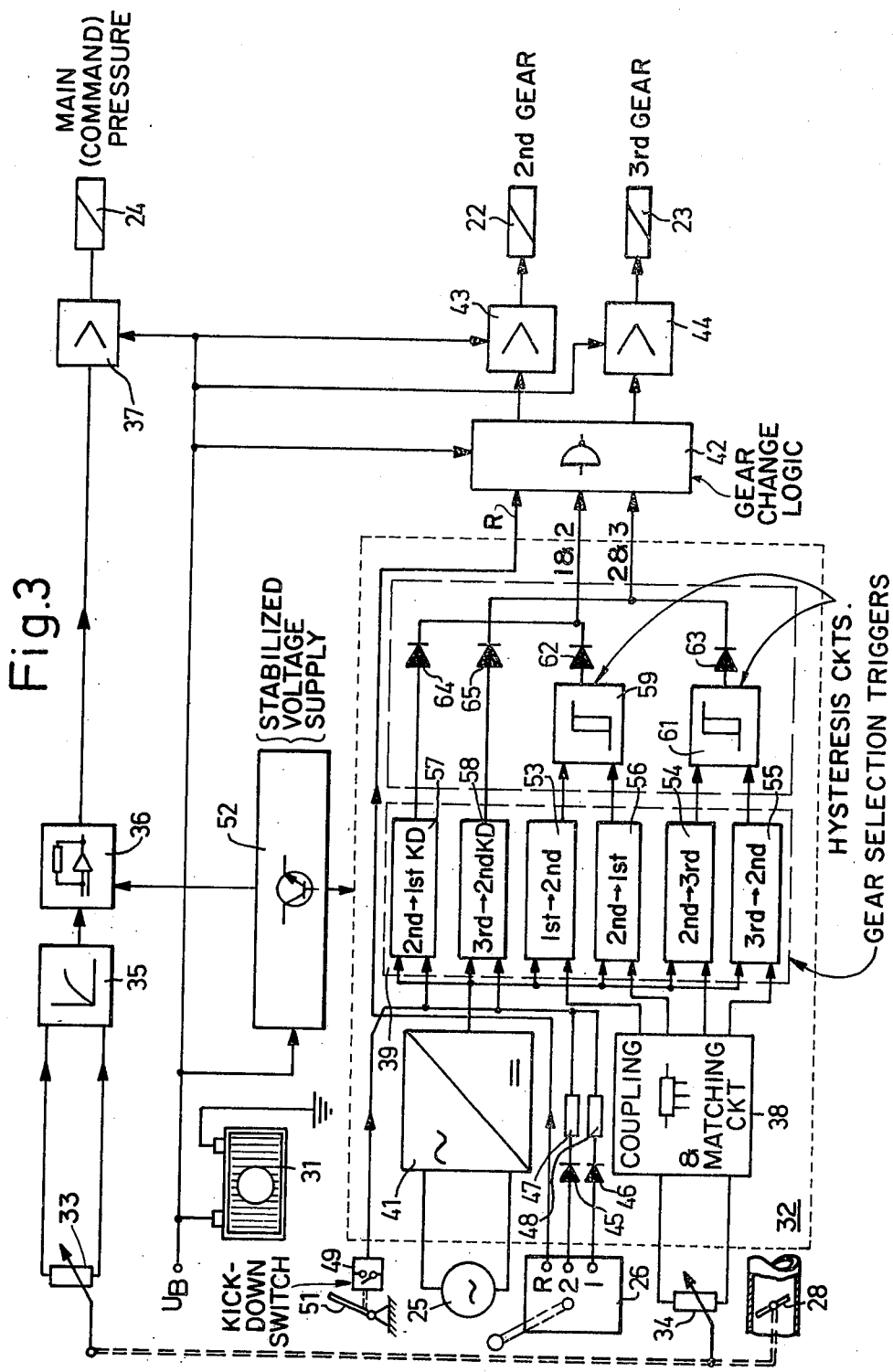
FIG. 3 is a more detailed block circuit diagram of the control system of FIG. 2.
Figure 5B:
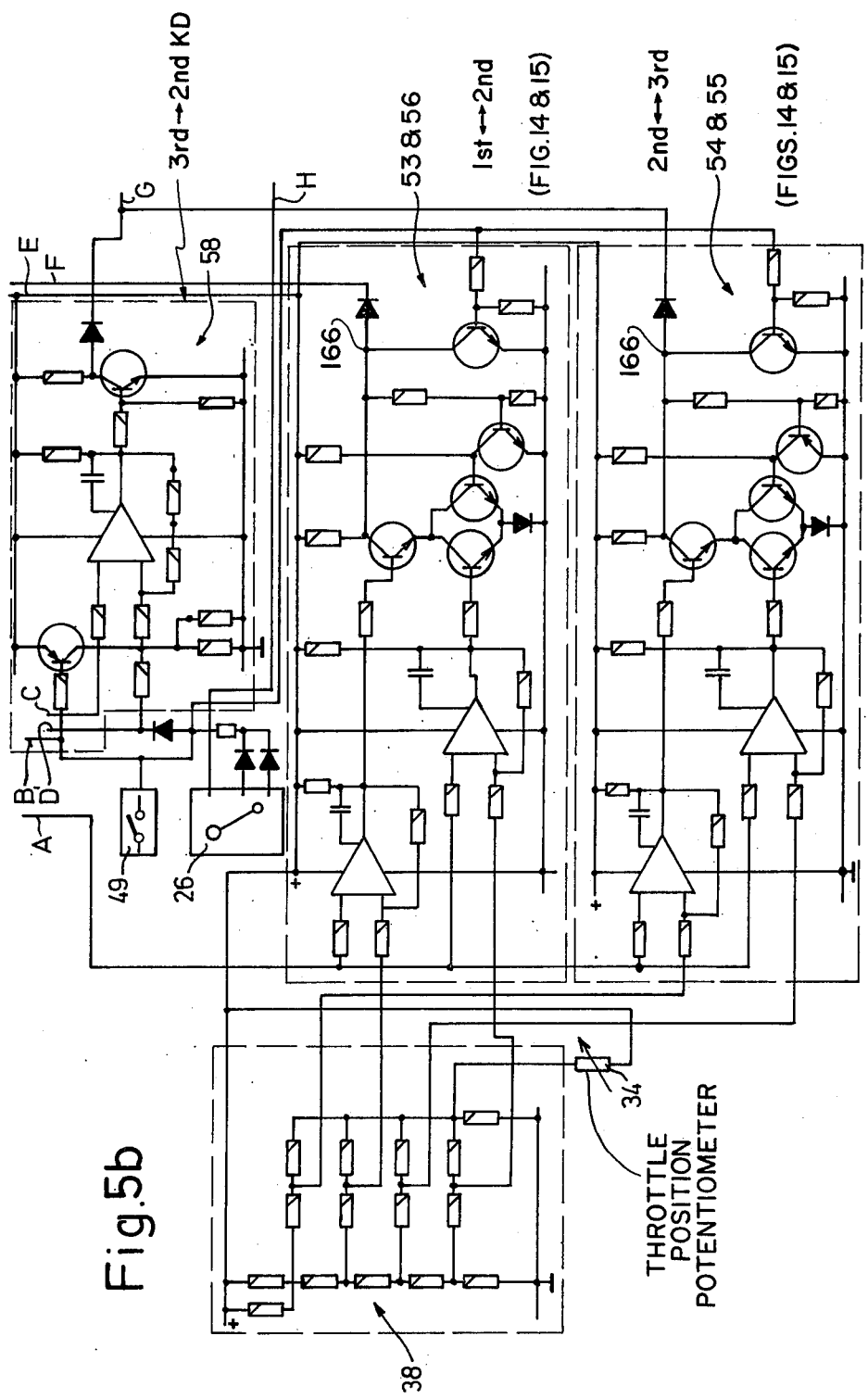
Figure 5C:
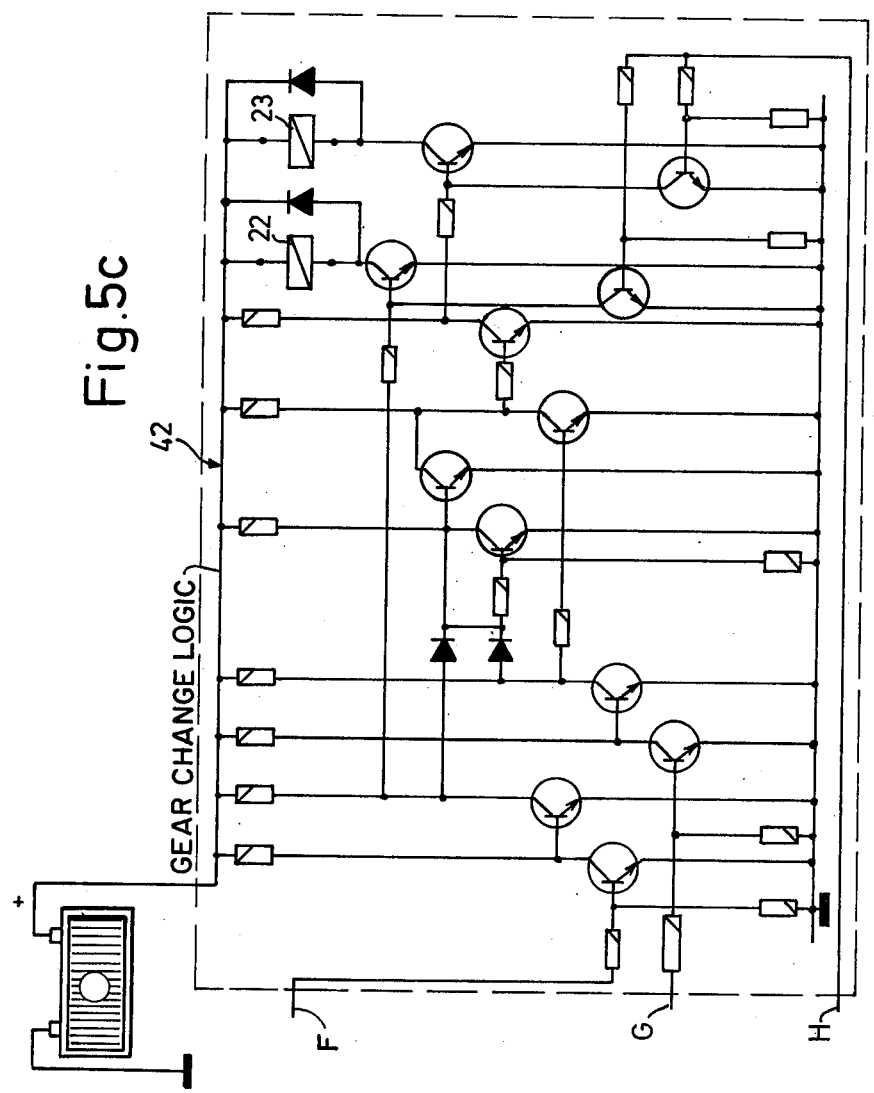
Figure 6:
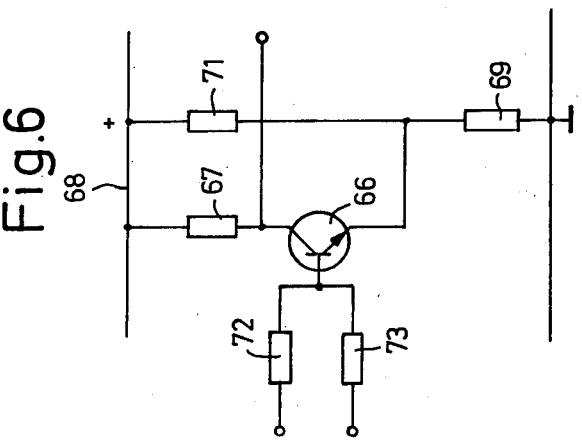
Figure 9:
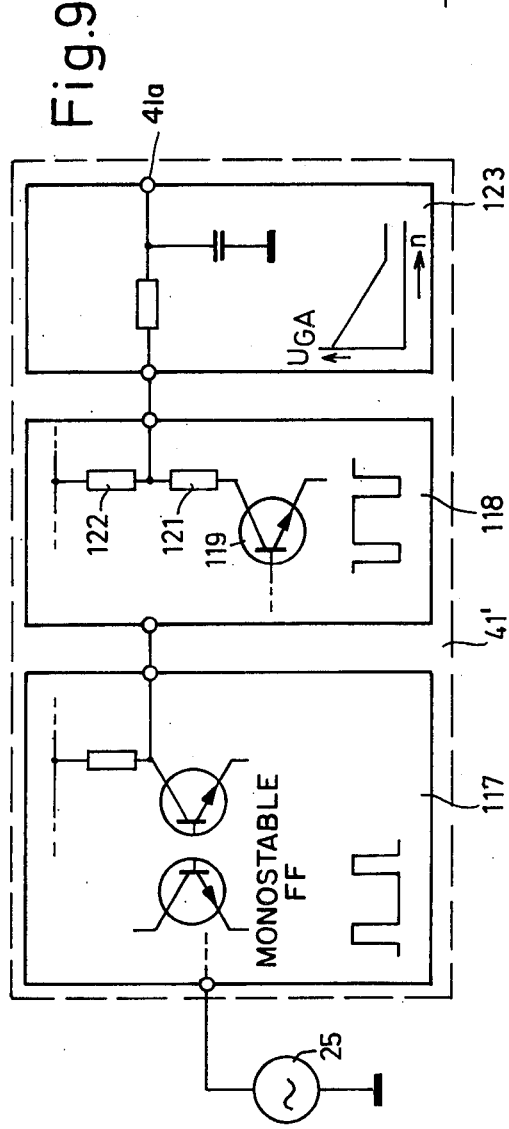
Figure 7:
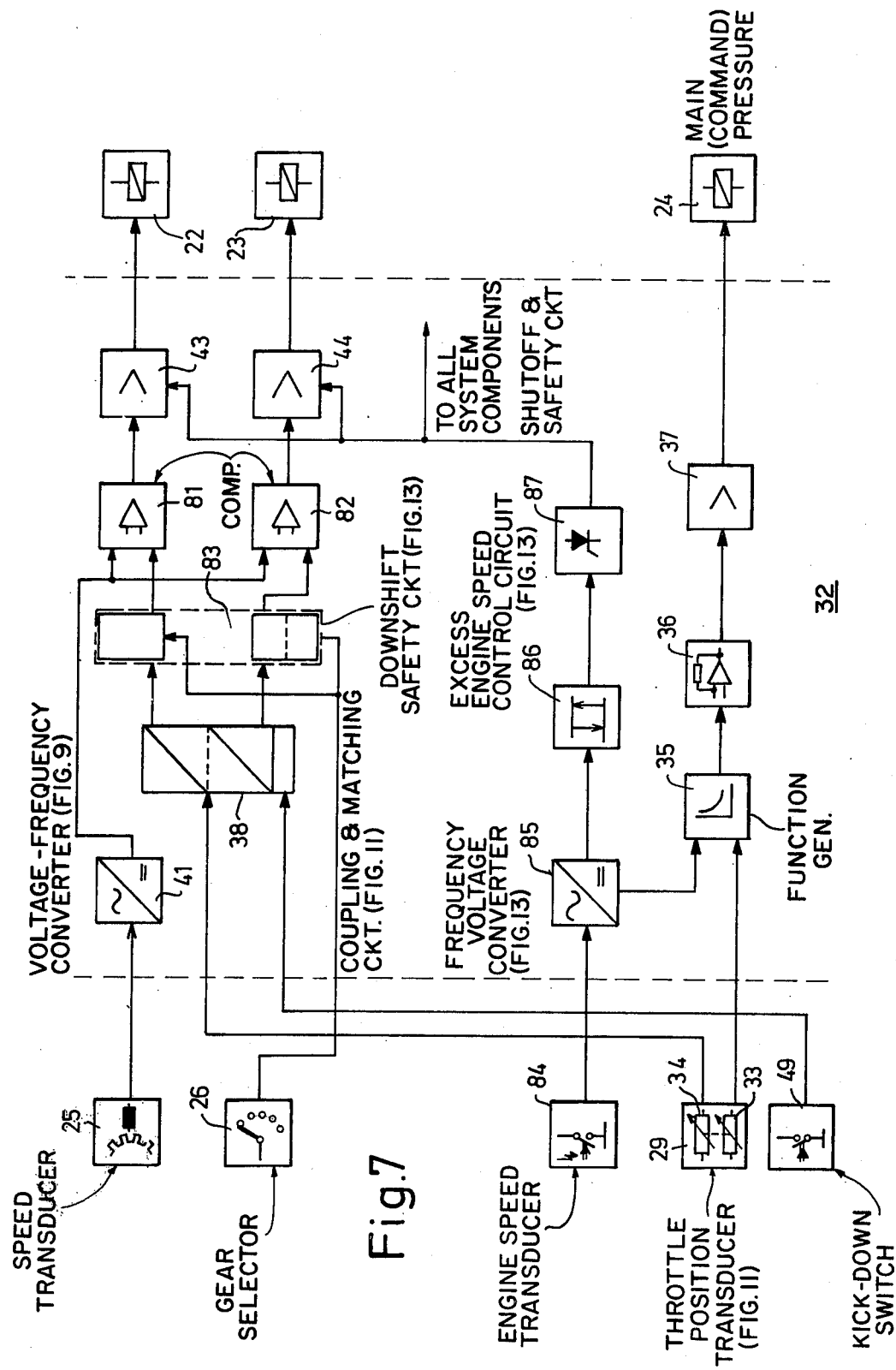
Figure 12:
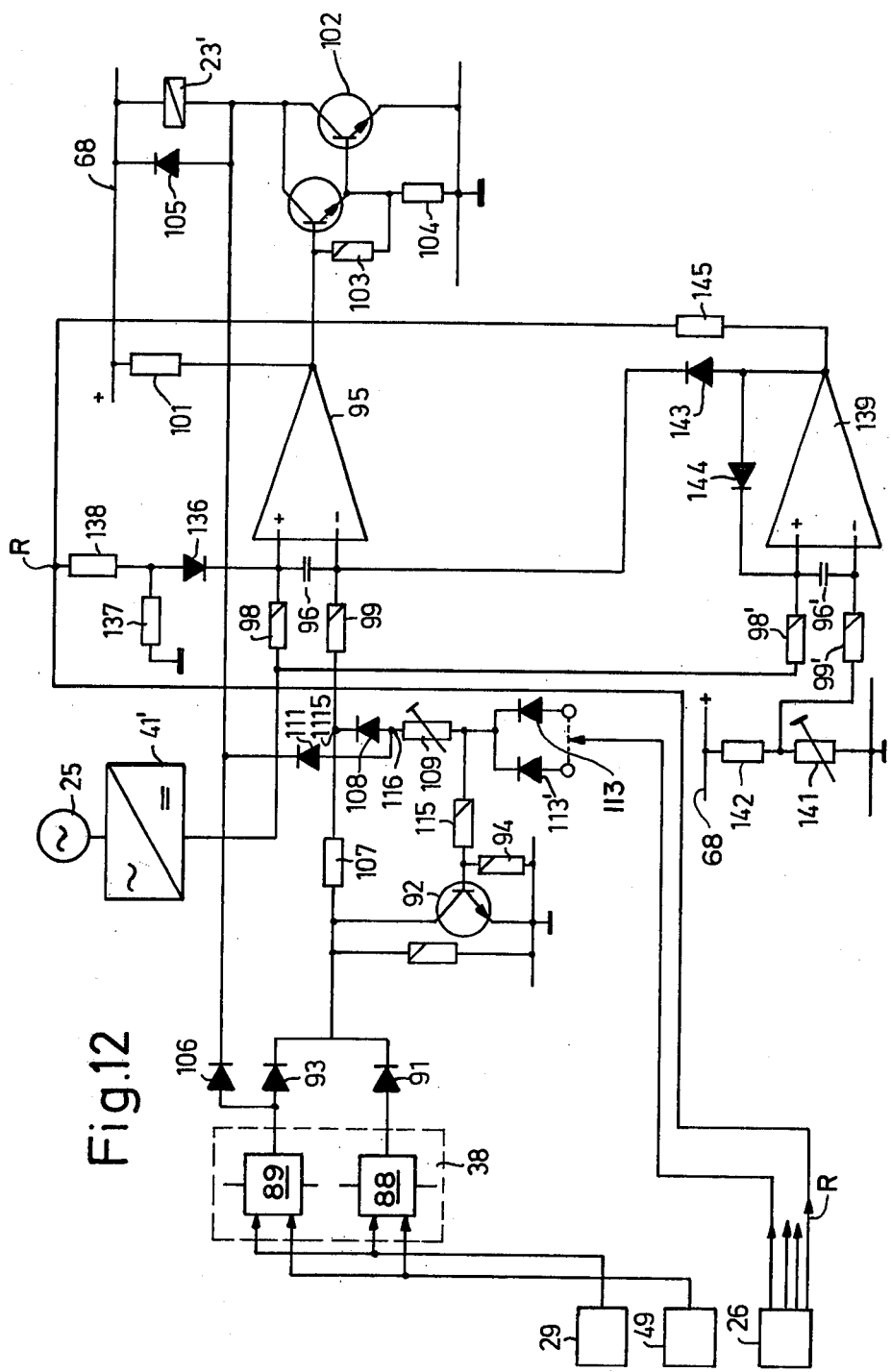
Figure 13:
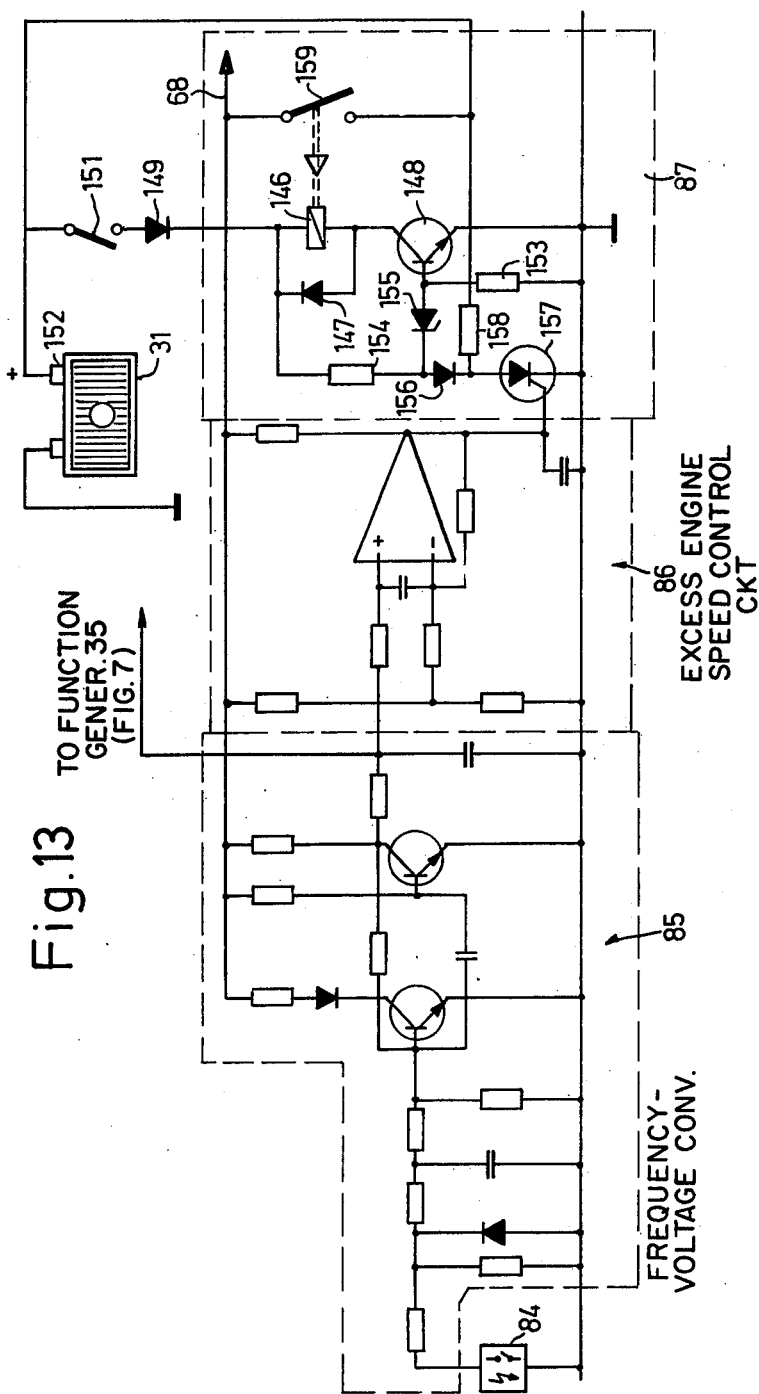
Figure 14:
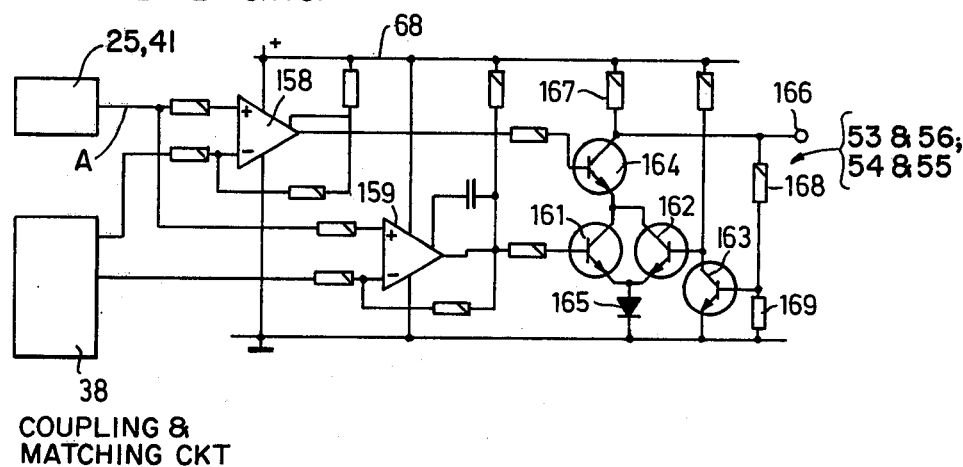
Figure 15:
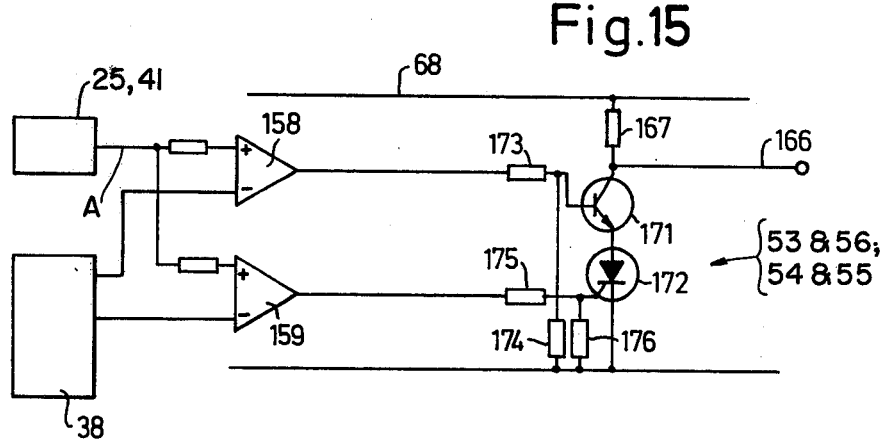

FIG. 5, collectively composed of FIGS. 5a, 5b and 5c, which are to be read together, shows the circuit of FIG. 3 using discrete elements;

FIG. 6 is a fragmentary circuit which can be used in the circuits of FIGS. 4 and 5 and illustrating a simple comparator;

FIG. 7 is a block circuit diagram of another embodiment of the control system in accordance with the present invention, corresponding essentially to FIG. 3;

FIG. 8 is a portion of the circuit of FIG. 7, illustrating components thereof in greater detail;

FIG. 8a is a table of signals controlling the gears of a 3-speed transmission;

FIG. 9 is a highly schematic abbreviated detailed circuit diagram of the frequency voltage converter circuit having an inverse characteristic;

FIG. 10 is a fragmentary block circuit diagram of the circuit of FIG. 8, illustrating selective change-over of characteristics controlling the program of gear changing;

FIG. 11 is a detailed circuit diagram of a coupling and matching circuit, and showing one embodiment of element 38 of FIG. 2;

FIG. 12 is a fragmentary circuit diagram of the circuit of FIG. 8, and illustrating changes in the circuit for differently constructed gear control valves requiring a different control program to effect gear range changing;

FIG. 13 is a detailed block and circuit diagram of an excess motor speed safety circuit;

FIG. 14 is a detailed circuit diagram of a trigger stage forming elements 53, 54, 55 or 56 of the circuit of FIG. 5; and FIG. 15 is another circuit diagram of a trigger stage showing a circuit arrangement which is simplified with respect to that of FIG. 14.

The basic principle of the invention will be described in connection with FIGS. 1 and 2, taken together: An automatic gear change transmission 21 is connected to an automotive engine, not shown, driving the transmission from the left; the output shaft of the transmission is at the right thereof (FIG. 1). The specific gear range of the transmission 21 is controlled by valves. A first magnet valve 22 controls engagement of the second gear; a second magnet valve 23 controls engagement of the third gear; a third magnet valve 24 is connected to the main pressure controller, and controls the command pressure of hydraulic fluid which operates the various brakes and clutches within the automatic transmission 21. A speed transducer 25 is connected to the transmission output, and provides a signal of varying frequency, proportional to transmission output speed, and hence to vehicle speed. A manual gear selector 26 is provided, having the customary positions "P-R-N-D-2-1" for a 3-speed transmission. The gear selector 26 is also coupled to the transmission 21. The accelerator or control pedal 51 for the engine controls the throttle 28. The position of the throttle 28 is transduced into an electrical signal by a throttle position transducer 29. The throttle position transducer 29 can be connected either to the throttle or to the pedal 51; if to the latter, it can be directly coupled with a kick-down switch 49 to command rapid downshifting. Electrical power is supplied from vehicle battery 31. The battery 31 is connected to the electronic control system 32, which has the output of the speed transducer 25, the gear selector 26, the throttle position transducer 29, which provides a signal representative of loading on the engine, and of the kick-down switch 49 applied thereto.

Throttle position transducer 29, which provides a load-representative output signal, has two electrically separate potentiometers 33, 34. Potentiometer 33 is connected to a function generator 35 which provides an output signal which has a non-linear relationship with respect to the input, matched to the operating characteristics of the engine. Function generator 35 is connected to a current control and limiter circuit 36 which, in turn, is connected to an output amplifier 37. Output amplifier 37 controls the main pressure control, or command pressure control valve 24. The potentiometer 33 of the transducer 29 provides a command signal of that pressure of hydraulic fluid flowing through the main pressure control which is commanded by the operator. The current through the solenoid coil of valve 24 itself can be controlled by a servo system, in which the current flowing therethrough is compared with an actual current flow value and reset if an error signal appears, to balance variations in the supply voltage, in the hydraulic pressure supply of the vehicle, changes due to temperature variations and hence resistance changes in the solenoid coil and the like. Such systems are well known and the drawing of FIG. 2 has not shown this comparator circuitry.

The second potentiometer 34 of the transducer 29 controls the switching sequence of the gear range changes of the transmission. The voltage supplied by the second potentiometer 34 is initially connected to a coupling and matching circuit 38, the details of which will be explained below, and an embodiment of which is illustrated in FIG. 11. The circuit 34 provides an output signal which is suitable to control a group of trigger or flip-flop circuits 39, collectively shown as the gear selection flip-flops (FF).

The speed transducer 25 which, typically, is an inductive transducer, is usually coupled to the park lock gear of the transmission. It provides an output voltage which has a frequency corresponding to the output speed of the transmission 21. A frequency-voltage converter circuit 41 provides a direct output voltage corresponding to the frequency, and hence to vehicle speed. The output signal from converter 41 is likewise applied to the gear selection FF's 39. The gear selection trigger stages 39 are connected to a switching logic 42, the output signals of which are connected over output amplifiers 43, 44, respectively, to the first valve 22, controlling engagement of the second gear and the second valve 23, controlling engagement of the third gear. The gear change logic matches the input signals applied thereto to the particular brake and clutching arrangements of the specific transmission being controlled.

The selector 26 provides electrical output signals which are applied to the gear selection triggers 39 as well as to the gear change logic 42, directly.

Details of the general circuit illustrated in FIG. 2 are shown in FIG. 3, in which similar parts have been given the same reference numerals, and only additional elements will now be described: Gear selector 26 has electrical switching contacts which provide signals representative of the position of the gear selector; thus, if upward shifting is to be limited to a specific gear range - for example to effect engine braking, signals BG2, BG1, or R are provided, corresponding either to engagement of the second gear as a maximum speed range, the first gear, as a maximum range, or reverse. The signals BG2 and BG1, derived from appropriate contacts schematically illustrated as 1, 2, R in FIG. 3 are connected over decoupling diodes 45, 46 and decoupling resistors 47, 48 to the gear selection triggers 39. The output of kick-down switch 49 is also connected to the input of the gear selection triggers 39. Kick-down switch 49 is controlled by the operator pedal 51. The reverse, or R signal from gear selector 26 is directly connected to the gear change logic 42.

A stabilized voltage supply 52 is connected to the positive battery terminal to supply those components of the system with a stabilized operating voltage which would be sensitive with respect to changes in voltage level of the supply source.

The gear selection triggers or flip-flops 39 contain six separate FF's. One FF 53 is provided to control upward shifting from the first to the second gear; FF 54 controls upward shifting from the second to the third gear; FF 55 controls downshifting from the third to the second gear; FF 56 controls downshifting from the second to the first gear; and FF's 57, 58 are controlled by the kick-down switch 49 and provide for downshifting from the second to the first, and from the third to the second gear range, respectively. The shift directions controlled by the respective flip-flops have been indicated in FIG. 3, and the notation KD has been added to FF's 57, 58 indicating that these FF's are controlled by the kick-down switch. The FF's 53 and 56, as well as the FF's 54, 55 are connected over respective hysteresis logics 59, 61 and decoupling diodes 62, 63 to the gear change logic 42. Kick-down FF's 57, 58, which should operate rapidly, are directly connected over decoupling diodes 64, 65 to the gear change logic 42, FF 57 controlling change between first and second gear being connected to the output of hysteresis circuit 59 controlling the respective similar range changes in both directions, with hysteresis, and FF 58 being connected to the output of hysteresis circuit 61 controlling up and downshifting between second and third gear.

The circuit of FIG. 3 can be built up of a group of integrated circuits IC1, IC2, IC3, IC4. The arrangement of these integrated circuits to construct the system of FIG. 3 is shown in FIG. 4, in which the reference numerals of the elements of FIG. 3 have been indicated to illustrate which circuit components are included in which integrated chips. The output amplifiers 37, 43, 44 preferably are discrete power transistors, as shown.

The circuit of FIG. 3 can also be constructed of discrete components, as shown in FIG. 5 (on three sheets, individually labelled FIGS. 5a, 5b, 5c; the connecting lines which connect from one sheet to another have been given letter designations A–H). The triangle symbols indicate operational amplifiers, the rectangles indicate resistors, the slant line on some of the resistors indicating higher power rating than those not so distinguished. Switch 52' sets the operating range and characteristics of the stabilized voltage supply 52 and could be omitted.

The reference numerals used in FIG. 3 have also been used in FIG. 5, so that a detailed description of the circuit is not necessary. The stabilization circuit 52 is not strictly necessary if only that stage which controls the main pressure requires a stabilized voltage. A single stage can be adequately supplied by a Zener diode stabilized circuit, of well-known arrangement. The voltage supply for the converter circuit 41 and for the gear selection FF's 39 then will be battery voltage 31. It is recommended to include a low-pass filter in advance of the main power bus supplying the circuit to filter stray voltage peaks and other possible spurious voltages and prevent their application to the control system, which might result in spurious responses.

FIG. 6 illustrates a detailed circuit of a comparator which can be used in lieu of the operational amplifiers shown in FIGS. 4 and 5. In FIG. 6 (sheet 9 of the drawings) transistor 66 is connected over a collector resistor 67 to positive bus 68. An emitter resistor 69 is connected to the chassis or ground bus, for example the negative terminal of battery 31, so that positive bus 68 forms the supply line. A resistor 71 connects between the emitter of transistor 66 and positive bus 68. A plurality of parallel connected input resistors 73, 74 are connected to the base of transistor 66.

Operation of the circuit of FIG. 6: Transistor 66 becomes conductive when its base-emitter voltage exceeds a predetermined value, as set by the relative resistance values of resistors 71, 69, which together form a voltage divider. If the emitter of transistor 66 is placed at the voltage between ground or chassis and the voltage of the supply bus 68, and input resistor 72 is connected to one signal source which is to be compared with a signal source connected to resistor 73, then, by suitable choice of the resistance relationship of resistors 69, 71, as well as resistors 72, 73, transistor 66 will operate as a comparator - connected operational amplifier by providing an output which is representative of the relative values of the input signals. For example, resistor 72 is connected to the output of the comparator circuit 41, and resistor 73 can be connected to the output of the coupling and matching circuit 38 (FIGS. 2, 3).

A second embodiment of the invention is illustrated in FIG. 7, in which the control system 32', between dashed lines, corresponds to the control system 32 of FIGS. 1 and 2. Elements which are similar to those used in the embodiment of FIGS. 1–3 have been given the same reference numerals, and only the differences in the control circuit 32' with respect to those of control circuit 32 will be described in detail.

The voltage-frequency converter 41 provides a speed output signal which is connected to operational amplifier 81, forming a first comparator, and to operational amplifier 82, forming a second comparator. The output of operational amplifier 81 is connected over power amplifier 43 to valve 22; the output of operational amplifier 82 is connected over power amplifier 44 to second valve 23. The second potentiometer 34 of throttle position transducer 29 is connected to the input of the coupling and matching circuit 38; a second input is connected to the output of kick-down switch 49. Circuit 38 is connected to the inputs of a downshift safety circuit 83. Circuit 83 also has the outputs from gear selector 26 connected thereto. The outputs of the downshift safety circuit 83 are connected to comparator amplifiers 81, 82. As an additional item, an engine speed transducer 84 is provided, which furnishes output signals representative of engine speed. These signals can be directly derived from the ignition breaker circuit of the engine distributor, and the transducer 84 may, directly, be formed by the ignition breaker circuits, rotating in synchronism with engine rotation. A frequency-voltage converter circuit 85 is connected to transducer 84 which provides an analog voltage representative of the frequency of the output from transducer 84. The analog voltage from converter 85 is connected on the one hand to the function generator 35 to control generation of the engine characteristics transfer function, and to an excess engine speed control circuit 86, on the other. The safety circuit 86 controls a storage circuit 87, the output of which is connected to further inputs of the power amplifiers 43, 44, respectively.

FIG. 8 illustrates details of the circuit of FIG. 7 and specifically the portion which controls gear changing between first and second gear as well as between second and third gear. The principle and operation will be described in connection with only one half of the circuit of FIG. 8, namely the one concerned with gear changing between first and second gear. FIG. 8a illustrates, in binary notation, the particular gears engaged by a specific transmission upon the presence or absence of current flow through the respective solenoid coils 22', 23'; to engage neutral or reverse, the notation 0/1 indicates that the particular signal is irrelevant since control is effected by hand mechanically. There is a connection 27 for the neutral position. For control of reverse movement, the particular speed range for reverse in the selected gear is controlled by the solenoid 23'.

The coupling and matching circuit 38 has two separate resistance networks 88, 89. Resistance network 88 is provided to control shifting from the first to the second gear range; resistance network 89 is provided to control downshifting from the second to the first gear range. Two other similar networks, not labelled, are provided in the coupling and matching circuit 38, identical in operation to circuits 88, 89. Only the upper half of the circuit of FIG. 8 will be described in detail, since the lower half is identical thereto, provided to control energization of the respective valves 22', 23' for shifting between second and third gear.

Both networks 88, 89 are connected to throttle position transducer 29 as well as to the kick-down switch 49. The output of network 88 is connected over a first coupling diode 91 to the collector of a switching transistor 92. The collector of switching transistor 92 is also connected to the output of network 89 through a second coupling diode 93. The emitter of transistor 92 is connected to ground or chassis potential; the base-emitter path is bridged by a base resistor 94. Amplifier 81, operating as a comparator, has an operational amplifier 95 as the amplifying element. Resistor-capacitor input network 96, 98, 99 suppresses spurious signals at either or both inputs so that they will not noticeably affect the output of the comparator 81. The output of amplifier 95 is connected over a load resistor 101 to the positive supply 68, and further, over a direct line to power transistor 102. The power transistor 102 is constructed of two specific transistors, connected in a Darlington circuit. Resistor 103 is connected between the base and emitter of the first transistor of the Darlington pair; resistor 104 is connected between the junction of the emitter of the first transistor and the base of the second on the one hand, and chassis potential on the other. The solenoid winding of the first valve 22' is connected between the collector of the transistor group 102 and positive bus 68; the winding is bridged by a free-wheeling diode 105.

The collector of the transistor 102 is further connected by a coupling diode 106 to the resistor network 89. The output of the speed transducer frequency-voltage converter circuit 41' connects an analog signal representative of speed of the transmission to the free end of the damping resistor 98, which is connected to the direct input of the operational amplifier 95. The free end of the damping resistor 95, connected to the inverting input of operational amplifier 95 is connected to a junction formed of a resistor 107, which is connected to the collector of transistor 92 and to the cathode of a diode 108. Diode 108 forms a fourth coupling diode and has its anode connected to a junction 116 to which a second coupling resistor 109 is connected. Junction 116 is connected to a fifth coupling diode 111, which is connected to the junction of the collector of the output transistor 102 and the coupling diode 106 connected to the output of the network 89. A coupling resistor 115 is connected to the base of switching transistor 92; the other terminal of resistor 115 is connected to the free terminal of coupling resistor 109 and to a decoupling diode 113 which is connected to a selector terminal 114 for the gear selector 26. Coupling diode 113' is connected to an output of the kick-down switch 49.

The gear change operation of the particular transmission for which the circuit of FIG. 8 is adapted - which is an example only - is indicated in binary form in FIG. 8a, in which a 1-signal indicates energization of the respective solenoid 22', 23' and a zero indicates de-energization. In first gear, first magnet valve 22' and second magnet valve 23' are energized. In second gear, first magnet valve 22' is de-energized, and second magnet valve 23' is energized. In third gear, both valves 22', 23' are de-energized. In reverse, the second magnet valve 23' must be energized, whereas the position of the first magnet valve 22 is irrelevant, as indicated by a 0/1 notation in the table of FIG. 8a. In neutral, both valves 22', 23' may be either energized or de-energized, as indicated by the 0/1 notation in FIG. 8a. The selector 26 provides at least one output signal for each particular selector position corresponding to the respective selector position; the other terminals are de-energized.

The converter circuit 41' has a transfer characteristic which is schematically indicated by the diagram next to the circuit 41' on FIG. 8, that is, as the speed and hence the frequency of the signal from speed transducer 25 increases, the output voltage drops; the output signal remains constant above a predetermined speed limit. The network 88 provides an output which drops in dependence on increasing deflection of the throttle 28, as indicated by the graph within the box 88. Network 89 has a similar characteristic, but at a different absolute voltage level. Under kick-down conditions, that is, when the throttle control 51 is completely depressed to floor level, so that kick-down switch 49 is closed, a steep drop of the output is derived from the network 88, 89, respectively.

The transducer 29 may be an analog-operating potentiometer or a stepped potentiometer having, for example, ten steps. Such an arrangement permits, for example, the generation of four characteristic curves having different slope lines to provide for different switching points of the comparators 81, 82.

When the gear selector 26 is at a specific command position, the respective terminal provides a 1-signal.

Operation of circuit of FIG. 8: Let it be assumed first that the inverting input of operational amplifier 95 of comparator 81 is at approximately ground or chassis potential. The operator then places the selector 26 in the position commanding the first gear. Energization of valves 22', 23' will be commanded since the output of converter circuit 41' will be high. The power transistor 102 will be conductive. This places the cathode of the third coupling diode 106 at ground or chassis potential, and thus also places the output of the network 89 at ground or chassis potential, effectively short-circuiting the output of network 89. The output voltage of network 89, if not short-circuited by diode 106, would be high, however, if the throttle control 51 is not completely depressed. If the operator provides fuel to the engine, that is, depresses the throttle control, the output voltage of network 89 decreases, that is, becomes less positive. Any position of controller 51 will cause a corresponding predetermined voltage at the inverting input of the comparator amplifier 95. If the speed of the vehicle is low, then the voltage on the direct input of the comparator 95 will be positive with respect to the voltage at the inverting input. As the speed of the vehicle increases, the voltage derived from the converter circuit 41 drops until the voltage at the direct input of comparator 95 will be negative with respect to the voltage at the inverting input thereof. This causes amplifier 95 to switch over, and causes transistor 102 to block and to disconnect the first valve 102. Power transistor 102, upon being blocked, has a collector voltage which is essentially that of the power supply 68; this voltage is reflected to the cathode of the third coupling diode 106, which will likewise block, and the short circuit across the output of network 89 is lifted. The function and transfer characteristics of network 89 now may become effective.

The output voltage of the network 89 is so arranged that it is higher than the output voltage of network 88. As a result, the diode 91 is blocked. The difference in output voltages between the networks 88, 89 results in hysteresis between the characteristics of the networks 88, 89. The vehicle may retard until the output voltage of converter circuit 41' drops below the value which is determined by the output voltage of network 89. It is important to note that the output of network 89 is short-circuited by the output stage from the final or output transistor 102.

The voltage comparison level of the comparator 82 is not affected by the foregoing by suitably selecting the resistors corresponding to resistors 98, 99, resistor 97 and resistor 101 of the comparator 82 to respond only at lower levels of voltage supplied from converter 41'.

Switching transistor 92 is not used in normal driving operation, and remains in blocked condition. A positive signal will be supplied over input 114 to diode 113 and base resistor 115 to the base of transistor 92 only if the driver specifically selects the first gear, or if kick-down switch 49 is operated, providing a signal over diode 113' to the resistor 115 and hence to the transistor 92. Under those conditions, transistor 92 becomes conductive, resulting in short-circuiting of the outputs of both of the networks 88, 89 behind the coupling diodes 91, 93. Simultaneously, voltage is placed by means of voltage divider formed of resistors 107, 109 on the inverting input of the operational amplifier 95 of comparator 81. Amplifier 95 thus receives a new and fixed switching threshold. The first coupling resistor 107 and the second coupling resistor 109 are so dimensioned that the junction 1115 thereof will have a voltage appear thereat which is close to that of chassis or ground potential - which is reasonable since transistor 92 is conductive, thus placing its collector close to ground or chassis potential. This voltage will be independent of the output voltage of the networks 88, 89. If the vehicle has a speed which is greater than that which corresponds to the threshold level set by the voltage division ratio of resistors 107, 109, then the output voltage of converter circuit 41' will become negative with respect to the voltage applied to the inverting circuit, so that the output of the amplifier 95 will also be close to ground potential, thus preventing energization of valve 22'. If the vehicle speed decreases, then the output voltage of converter circuit 41 increases and will rise above the limit value set by the voltage at terminal 114. This causes energization of the first valve and thus down-shifting into first gear. At this time, the voltage at junction 116 between the fourth coupling diode 108 and the second coupling resistor 109 is placed at essentially ground potential due to conduction of final output transistor 102, the voltage level at the collector of which is reflected back through diode 111. By suitable dimensioning of the resistance values, the voltage at junction 1115 for the direct input of amplifier 95 is always below the level of the voltage derived from converter circuit 41 above a predetermined speed of the vehicle. Thus, the vehicle can be accelerated without up-shifting, thus providing for holding the vehicle in the selected gear.

The circuit of FIG. 8 additionally provides for protection of the engine and of the vehicle against operation at excessive engine speeds, or with too low a gear range. The system described permits limitation on vehicle speed in first gear. In accordance with the system of FIG. 8, the limitation to the first gear will be ineffective if vehicle speed is excessive regardless of a first gear command from the selector 26. The comparator amplifier 95 switches only if the output voltage at the converter circuit 41' is higher than the output voltage on the direct input, that is, only when the vehicle speed has dropped below a certain maximum permissible level. Thus, the circuit, while providing for self-holding of a gear, when commanded, also in a simple manner solves the problem of protecting the transmission as well as the engine against excessive speeds in selected ranges. The gear change arrangement to switch between second and third gear is similarly constructed, and the operation to command, for example, engagement of the second gear only and to limit the maximum vehicle speed with second gear engaged is similar. If the selector 26 limits gear change to the second gear then, depending on loading on the motor and output speed of the transmission, switching or gear changing between first and second gear, under control of the networks 88, 89, will be unaffected.

Upon selection of reverse, it is necessary that the output signal from the speed transducer first have the maximum value derived thereby before the respective valve can be energized. The selection of reverse is not specifically illustrated since it can readily be derived from the circuits specifically described and explained.

A detailed circuit diagram for the converter 41' converting a frequency-dependent output in a voltage which drops as the frequency increases is illustrated in FIG. 9. Transducer 25 is connected to a monostable flip-flop 117 which provides pulses of constant pulse duration and amplitude, and having a frequency repetition rate depending on the frequency of transducer 25. The monostable FF 117 provides the pulses, which are schematically shown within the block 117, to an inverter 118. Inverter 118, as its active element, for example has a transistor 119 with a tapped collector resistor formed of two resistor elements 121, 122. The output, taken across the tap point is connected to a low-pass filter 123. The output from the low-pass filter 123 is the output from circuit 41', and will have a voltage-frequency (or transmission output speed) relationship as indicated in the diagram in the bottom of block 123, in which the abscissa represents output speed of the transmission and the ordinate represents output voltage at terminal 41a.

FIG. 10 illustrates a modification of the control system of the present invention, in which various engine operating characteristics can be selected, as desired. Such a system may be useful, for example, when the vehicle is operated in various load modes, for example as a single vehicle, or to pull a trailer, so that the speed-load characteristics of the engine and the consequent gear shift relationships are matched to the load. A change-over switch 124 is provided to change the switching relationship. More than one coupling and matching circuit 38 is provided, each one having its own networks 88, 89. These circuits 38 are connected in parallel, and only a single change-over or transfer switch 124 is necessary, which supplies the supply voltage from positive bus 68 to the respective circuit 38. That one of the circuits 38 which is not connected to supply is entirely grounded. As a result, the anodes of the coupling diodes 91, 93, 106 are always at a lesser potential than the cathodes. Thus, the various circuits 38 are decoupled from each other, and mutual influence or mutual coupling is eliminated.

The detailed circuit of a matching and coupling network 38 is illustrated in FIG. 11, together with the circuit for the throttle position, or load signal transducer 29, in combination also with kick-down switch 49. The load signal transducer 29 has a fixed resistor 125 connected to positive bus 68 and a potentiometer 126 connected in series therewith. The slider of the potentiometer 126 is grounded, as is one of the terminals of the resistance element of potentiometer 126, and is coupled to the throttle 28, the position of which is also controlled by pedal 51. The connection between the throttle 28 and the slider of potentiometer 126 is so connected that greater deflection of the throttle 28 results in smaller resistance of potentiometer 126. In a preferred form, potentiometer 126 is a ten-step potentiometer. The hot or top (FIG. 11) end of potentiometer 126 is connected to a fourth coupling resistor 127 in the matching circuit 38. Coupling resistor 127 connects to one diagonal of a bridge circuit which includes resistors 129, 131, 132, 133. The diagonal to which coupling resistor 127 is connected has its first bridge resistor 129 connected to positive bus 68. A second bridge resistor 131 is connected between positive bus 68 and the other diagonal point. A diagonal resistor 132 is connected between the two diagonal points. The other diagonal point has a third bridge resistor 133 which connects to ground. The first diagonal point has a coupling resistor 134 and a decoupling diode 135 which connects to the kick-down switch 49 and then to ground. The resistors of the bridge can be variable - if intended to fit various vehicles, or engines of different operating characteristics, or an engine operating under different operating modes; they may also be made as fixed resistors, for example when the circuit is made in mass production for a specific application. The diagonal point to which coupling resistor 127 and bridge resistors 129, 134 are connected is additionally connected to the down-shift safety circuit 83 (FIGS. 7, 8).

FIG. 12 is a fragmentary circuit of the circuit diagram of FIG. 8 and illustrates an arrangement if a different control pattern than that illustrated in FIG. 8a is desired. Various transmissions have different control patterns of opening and closing of the respective control valves. The arrangement of FIG. 12 is so connected that the solenoid coil 23 of the magnetic valve is not energized when the gear selection lever is placed in reverse. In all other respects, the same shifting pattern as that of FIG. 8a pertains.

Only those parts which differ and operate differently from the circuit of FIG. 8 will be described. A voltage divider formed of resistors 137, 138 is connected between ground or chassis potential and the "reverse" terminal of gear selector 26, indicated with R. The tap or division point of the voltage divider is connected through a coupling diode 136 to the direct input of operational amplifier 95. An additional operational amplifier 139 is provided having its input connected through damping resistors 98', 99' with a cross coupling capacitor 96, similar to resistors 98, 99 and capacitor 96 of operational amplifier 95. The direct input of amplifier 139 is connected through its damping resistor 98' to the input of damping resistor 98 of amplifier 95, that is, to the output of frequency-voltage converter 41'. The inverting input of operational amplifier 139 is connected through its damping resistor 99' to the tap point of a voltage divider formed of resistors 141, 142. Resistor 141 is connected to ground or chassis, and resistor 142 is connected to positive bus 68. The output of operational amplifier 139 is connected through a diode 143 to the inverting input of operational amplifier 95. A second diode 144 connects the output of operational amplifier 139 back to the direct input. A resistor 145 connects the output of operational amplifier 139 to the reverse, R terminal of the gear selector 26.

Operation: If reverse is selected by the gear selector 26, terminal R will have a 1-signal, or positive voltage thereat. This places the direct input of amplifier 95 at positive voltage, and could cause energization of the second magnet valve 23'. Should the vehicle operate forwardly, and with excessively high speed, then the direct input of the additional amplifier 139 will be at essentially ground potential. When the vehicle speed drops below a predetermined value, the inverting input of amplifier 139 will become positive, and amplifier 139 will switch over. Switching over of the additional amplifier 139 is coupled through diode 143 to the inverting input of amplifier 95 which causes the inverting amplifier 95 to likewise switch over, disabling, or de-energizing the second valve 23. At the same time, the additional operational amplifier 139 has its output fed back over the second diode 144 so that amplifier 139 remains in switched-over state, even if vehicle speed again rises. This permits rapid reverse operation, as soon as the second valve 23 has been de-energized. This condition is cancelled only when the selector 26 is removed from the position R. The circuit, therefore, is also self-holding.

FIG. 13 illustrates an excess engine speed control circuit useful as the circuit in elements 85, 86, 87 of FIG. 7.

If, due to malfunction in the electronic elements, or due to other causes, such as operator error, or the like, a gear is placed in selected position while the vehicle is operating at an excessive speed with respect to the selected gear, then it is necessary that the positive bus 68 energizing the system is disconnected from the battery 31. The circuit is so arranged that the seriousness of such malfunction, or error, is made apparent to the operator by holding the disablement of the circuit until the car is serviced, or power is disconnected by disconnecting one of the battery terminals.

The input to the circuit is a transducer 84 which directly transduces engine speed; preferably, transducer 84 is the ignition breaker contact which is mechanically coupled to the engine. Transducer 84 is connected to a frequency voltage converter circuit 85 which is conventional, and thus not described in great detail; the circuit of FIG. 9 may also be used omitting, however, the inverting stage. The circuit 85 includes a rectifier, a monostable flip-flop, and a low-pass filter. The output of circuit 85 is connected to the input of the actual excess engine speed control circuit 86. Circuit 86 includes a conventionally connected operational amplifier. The operational amplifier has its output connected to the actual control or disabling circuit 87. Circuit 87 is a storage circuit which simultaneously effects disconnection of the system. The storage circuit 87 includes a relay 146 having a free-wheeling diode 147 connected in parallel to the coil thereof, and an operating or power transistor 148 having its emitter-collector path connected in series with relay 146. The emitter of transistor 148 is connected to chassis or ground; the free terminal of relay 146 is connected through diode 149, poled in the same direction as current flow through transistor 148 to the ignition switch 151 and hence to the positive terminal 152 of battery 31. The base-emitter path of transistor 148 has a base resistor 153 connected in parallel thereto. The end of the winding of relay 146 which is remote from the collector of transistor 148 is connected to the series circuit of a resistor 154 and a Zener diode 155 which connects back to the base of transistor 148. The junction point of resistor 154 and Zener diode 155 is connected to the series circuit of a diode 156 and a thyristor 157. A resistor 158 connects the junction between diode 156 and thyristor 157 to the positive terminal 152 of the battery 31, for example by being connected to the illumination circuit of the vehicle. It is to be noted that the connection of resistor 158 bypasses the ignition switch 151. The connection from positive terminal 152 of the battery also goes to a switch terminal of the relay contact 159, the other terminal of which connects to the positive bus 68 which supplies the system with power.

Operation: In ordinary operating conditions, transistor 148 is conductive, and thyristor 157 is blocked. The base of the transistor 148 thus has a high positive voltage applied thereto. Conduction of transistor 148 causes the relay 146 to be energized, thus closing switch 149. All portions of the electronic control system thus are directly energized through switch 159 from the battery 152. Let it be assumed that the engine speed rises to a level which might cause damage or destruction to the engine. As the engine speed rises, the frequency of the signal derived from transducer 84, that is, from the ignition breaker contacts, will increase, and the output voltage of frequency-voltage conversion circuit 85 will increase to trigger the operational amplifier in circuit 86. This triggers the thyristor through the output connection from the operational amplifier to the gate of the thyristor 157. Triggering the thyristor 157 effectively short-circuits the base voltage, and causes the base of transistor 148 to drop to approximately zero level. This causes the transistor to block, and relay 146 will be de-energized. The de-energized relay which is of the normally open type causes opening of the switch contacts 159 and the positive bus 68 is de-energized. The thyristor 157 remains conductive even if thereafter the ignition switch 151 is opened, since resistor 158 will continue to supply current to the main switching path of the thyristor 157, directly from battery terminal 152. To disable the block, therefore, it is necessary to either remove one of the terminals from the battery 152, or to open a special reset switch which may be placed in series with resistors 158.

The trigger stages 53, 54, 55, 56 (FIGS. 3 and 5b) are shown in greater detail in FIGS. 14 and 15; the circuit of FIG. 15 is a simplified circuit which has the same effect, but uses different components.

FIG. 14: Operational amplifiers 158, 159, connected as comparators, have their inputs connected in conventional manner to the outputs of the speed transducer through the frequency-voltage converter circuit, and are further connected to the output of the coupling and matching network 38. The output line has been given the same designation A as the output from circuit 41 in FIG. 5a. The outputs of comparator operational amplifiers 158, 159 are connected to an active circuit which, essentially, has four transistors 161, 162, 163, 164. The emitters and collectors of first and second transistor 161, 162 are connected together. The emitter is connected to chassis or ground through a diode 165. The base of transistor 161 is connected to the second comparator 159. The base of the second transistor 162 is connected to the collector of the third transistor 163, and additionally through a collector resistor to positive bus 68. The emitter of the third transistor 163 is grounded. The collectors of transistors 161, 162, connected together, are connected to the emitter of the fourth transistor 164, the base of which is connected to the output of the first comparator operational amplifier 158. The collector of the fourth transistor 164 is connected to the output 166 of the respective trigger circuit. A load resistor 167 connects the collector of transistor 164 to positive bus 68. The output 166 is additionally connected to a voltage divider formed of resistors 168, 169, the tap point of which is connected to the base of the third transistor 163.

Operation: Let it be assumed that, before a gear switching or gear change operation is to be effected, the fourth transistor 164 is conductive. If the output of the second comparator 159 switches to a high voltage, the previously blocked transistor 161 will become conductive. This causes the voltage at the output 166 to collapse and reach approximately ground potential, so that the third transistor 163 will block. Positive voltage from positive bus 68 is now applied to the base of the second transistor 162 which will also become conductive. Transistor 162 then cannot be extinguished by a voltage change at the output of the second comparator amplifier 159. Rather, comparator 158 must first drop to a low voltage before second transistor 162 can block. This circuit, therefore, provides for hysteresis between up-shifting and down-shifting, thus preventing excessive gear changing of the automatic transmission if the speed of the vehicle fluctuates within small ranges.

FIG. 15: The input to the circuit of FIG. 15 is similar to that of FIG. 14, and similar components have been given the same reference numerals. The output of first comparator 158 is connected to the base of a switching transistor 171, the collector of which is connected to the output 166' of the circuit, and to load resistor 167'. The output of the second comparator 159 is connected to the gate of a thyristor 172 through a coupling resistor 175. The anode of thyristor 172 is connected to the emitter of switching transistor 171. The cathode of thyristor 172 is grounded. The base of switching transistor 171 is connected to a customary voltage divider formed of resistors 173, 174. The gate of the thyristor is likewise connected to a voltage divider formed of coupling resistor 175 and gate resistor 176.

Operation: If comparator 159 switches to high voltage even if only momentarily, thyristor 159 will fire and will remain conductive. Even momentary voltage jumps in the second comparator 159 are thus stored by the conductive state of thyristor 172 until the main current flow through the transistor 172 drops below its holding current value. Transistor 171 blocks when the output of the first comparator 152 drops to approximately zero or ground potential, causing thyristor 172 also to recover and to block.

Both circuits of FIGS. 14 and 15 have the same basic operating results: As speed increases, that is, when the voltage on terminal A rises while the position of the throttle 51 remains constant, the down-shift threshold will first be reached, that is, the first comparator 158 will switch to positive voltage. The output 166 will remain at high voltage until the up-shift threshold is likewise reached. When the up-shift threshold is reached, second comparator 159 will switch to positive voltage and causes second transistor 162 (FIG. 14) to become conductive or, in the circuit of FIG. 15, causes thyristor 172 to fire. In the circuit of FIG. 15, the main current paths of both transistor 171 as well as of thyristor 172 are conductive, and output 166 is at a low voltage level; in FIG. 14, the low voltage of output 166 is obtained by conduction of transistors 161, 162. If the vehicle speed now drops below the up-shift threshold but remains above the down-shift threshold, second comparator 159 will switch back. The output 166 will remain at low level, however, since the thyristor 172 will remain conductive until the first comparator 158 also switches back, blocking the transistor 171 (FIG. 15); likewise, change in output level of comparator 159 is FIG. 14 has no effect on the circuit until comparator 158, also, switches to low output voltage.

The control system as well as the switching sequence, or switching program, of the transmission can readily be matched to specific vehicles, and also to specific operating requirements of the user of the vehicle. Matching of the operating program can easily be done by changing the respective resistance values in the networks 38. As clearly seen in the diagram of FIG. 5b, network 38 comprises a series of resistor combinations. A basic circuit can be provided having basic system components; change of the relative resistance values of less than twenty resistors can match the shifting pattern, and shifting requirements, to any operator convenience, or operating conditions; thus, vehicles largely used in mountainous countries may have lesser gaps between up-shift and down-shift speed ranges than vehicles used essentially in level areas. In the system as described, at most thirteen resistors have to be changed in the matching network 38 and four resistors in the kick-down trigger circuits that set the critical levels of the kick-down comparators. The resistors can be adjusted even when using thin-layer or thick-layer technology. It is also possible to use a single throttle position transducer for various types of vehicles, and then match the output by changing respective resistance relationships (see FIGS. 5, 14 and 15). The control system in accordance with the present invention can be made inexpensively and can be placed on very small circuit chips; the entire control circuit and the throttle position transducers can be placed in a single housing.

The trigger stages which control up-shifting and down-shifting can be built up of customary transistors, or can use the series circuit of a single transistor and a thyristor (FIG. 15). These circuits, in simple manner, provide for holding or memory capability, so that the output of the trigger stages does not depend on instantaneous conditions at the inputs thereof, but rather is additionally dependent on previously prevailing conditions at the inputs. Thus, hysteresis between up-shifting and down-shifting can be obtained, preventing excessive gear changes by the automatic transmission.

The embodiment described in connection with FIGS. 7 and 8 has the additional advantage that a down-shift safety circuit is incorporated therein which prevents downshifting of the gear even if the operator of the vehicle places the selector at a lower gear, and while the vehicle is operating at a speed which is excessive with respect to the particular gear selected. Thus, limitation of gear changing to the second or from the first gear range at excessive vehicle speeds or engine speeds is prevented. A reverse-lock can readily be incorporated therein which prevents engagement of the reverse gear if the operator of the vehicle switches the selector to the reverse position, although the vehicle is not stopped. An excess engine speed safety device prevents excessive engine speed if, due to malfunction in the control system or due to operator error, the engine would speed up to an excessive speed, if, for example, the vehicle is operated with an improperly engaged low gear. Such improper engagement may result also from malfunction of the system, malfunction of the transmission components, as well as operator errors.

The embodiment described in connection with FIGS. 7 and 8 has additional advantages: The negative or inverse relationship of output voltage with respect to transduced output speed of the transmission derived from the circuit 41' permits placing of the kick-down switch, as well as of the throttle position transducer to ground with one terminal. Thus, all connections of these components are effectively grounded when disconnected; destruction of the electronic components of the control system due to short circuit with ground is thus effectively avoided. Further, the particular gears can be selected only if the various safety circuits, by their operation, indicate that the engine will not be operated at excessive speeds. The gear change control only then permits down-shifting if the output speed of the transmission, that is, the vehicle speed has passed below a permitted maximum limit. The circuit of the speed converter network is so arranged that, above a certain speed, the output voltage remains constant. This permits re-acceleration after down-shifting has been accomplished within the predetermined limits built into the circuits, without immediate additional up-shifting. The circuit, therefore, permits holding in a given speed and, once the speed has been engaged when the vehicle had a vehicle speed below a predetermined limit, some acceleration above that speed; excessive acceleration and excessive engine speed would, however, then trigger the excessive engine speed circuit to shut down the entire system. Similar advantages are obtained in blocking of engagement of reverse gear of the transmission unless the vehicle is stopped first.

The excessive engine speed safety circuit is so arranged that the operating voltage from the entire system is disconnected when the engine speed reaches an excessive value. This disconnection is initally irreversible. Even interrupting the ignition, that is, removal of the ignition key does not reverse the operation of the excessive speed circuit. It is necessary to either operate an override switch (not shown) or to remove a battery terminal - an operation which requires substantial interference with the system and thus warning notice to the operator that something was amiss.

The circuit components can readily be so selected that erroneous or stray pulses do not cause erroneous gear change operation.

The output signals derived from the gear selector can be connected in any suitably desired way to the control system, for example by providing separate signals at separate terminals, one each being associated with a specific selector position; or, alternatively, different types of signals, or signals having different characteristics, can be associated with different gear selector positions, and still be used to operate the control system in accordance with the present invention.

Various changes and modifications may be made, and features described in connection with any one embodiment may be used with any other within the scope of the inventive concept.

We claim:

1. Electronic transmission gear changing control system, particularly for automotive automatic transmissions for combination with internal combustion engines, said transmission having at least two forward speed gear ranges (1st, 2nd, 3rd), gear selection operating means (22, 23, 24) connected to the transmission and engaging selected gears therein, and transmission output speed transducer means (25) coupled to the output of the transmission and generating a transmission speed signal, said engine having an engine controller (28, 51) and engine load transducer means (29) generating an engine operating signal;

said system comprising first and second separate control means (53, 54, 88; 55, 56, 89) connected to and controlling said gear selection operating means (22, 23, 24); the first control means (53, 54, 88) controlling shifting of gears in the transmission to higher speed ranges (53, 88: 1st to 2nd; 54: 2nd to 3rd) and the second control means (56, 55, 89) controlling shifting of gears in the transmission to lower speed ranges (55: 3rd to 2nd; 56, 89: 2nd to 1st) wherein switching thresholds, with respect to engine speed, of said first control means and said second control means, are different;

said separate control means each having inputs connected to and responsive to the transmission speed signal and to the engine loading signal.

2. System according to claim 1, wherein a kick-down controller (49) is provided engaged by said engine controller (51) and commanding instant down-shifting, said system further comprising third separate control means (57, 58; 113') connected to and controlling said gear selection operating means to effect down-shifting (58: 3rd to 2nd; 57, 113': 2nd to 1st) independently of control effected by said second control means (56, 55, 89).

3. System according to claim 1, wherein said separate control means comprises threshold responsive trigger stages (53, 56; 54, 55; 57, 58; 88, 89, 95) which change state when a shift operation is being commanded.

4. System according to claim 1, further comprising a manually positionable gear selector (26);

wherein the gear selector (26) has electrical terminals connected to the first and second control means to modify the signal level on at least one of the inputs thereof in accordance with the position of the gear selector.

5. System according to claim 1, wherein (FIGS. 2–3) the separate control means comprises bistable trigger stages (53, 54, 55, 56, 57, 58) connected as comparators and having as inputs said speed signal and said loading signal applied thereto, the triggers changing state when said signals have a predetermined relationship.

6. System according to claim 5, further comprising a coupling network (38) connected in advance of at least some of the trigger stages (53, 54, 55, 56) and having its output connected to the input of said trigger stages, said coupling network (38) having at least one of said signals applied thereto and modifying said signal before applying said signal to the respective trigger stage in accordance with the transfer characteristic of said network.

7. System according to claim 6, wherein the engine loading transducer means (29) is connected to the input of said network (38), said network comprising a resistance network (FIG. 5b: 38) and providing a plurality of modified output voltages for said separate trigger stages.

8. System according to claim 7, wherein the resistance network provides a separate output voltage for each of the trigger stages connected thereto, said voltages having a value depending on engine loading as sensed by said transducer means (29, 34).

9. System according to claim 8, wherein the resistance network comprises a single substrate chip.

10. System according to claim 5, the trigger stages have inherent hysteresis which is less than the difference in switching thresholds between the trigger stages forming said first and second control means, respectively.

11. System according to claim 5, wherein said trigger stages comprise operational amplifiers connected as comparators and having said signals applied thereto, at least one of said signals being modified in accordance with engine speed-load operating characteristics.

12. System according to claim 5, wherein (FIG. 6) the respective trigger stages comprise a transistor circuit having an operating transistor (66), a voltage divider connected between a source of supply, the tap point of the voltage divider being connected to the emitter of the transistor (66); and two input resistors (72, 73), a collector resistor connecting the collector to a source of supply, the output from said stage being taken across the transistor at the collector.

13. System according to claim 1, wherein (FIGS. 7, 8) the separate control means comprises separate network means (88, 89) connected to at least one of said signals, the separate network means providing two modified outputs, and a single trigger stage (81) connected to said outputs and controlling upward and downward shifting in accordance with the respective outputs from the separate networks;

and switching means (106) controlling which one of said outputs is effectively connected to said single trigger stage.

14. System according to claim 13, wherein the switching means comprises a unipolar feedback circuit (106) from the output of said trigger stage (81) and feeding back to the input thereof a signal if, and only if, the trigger stage has changed to command the higher speed range, to block operation of a signal from that one of the networks (89) controlling down-shifting unless the difference between the output from the down-shift controlling network (89) and the transmission speed exceeds a predetermined value.

15. System according to claim 13, wherein the transmission is a three-speed transmission and separate single trigger stages (81, 82) are provided for shifting between first and second speed range, and second and third speed range, respectively;

each said trigger stages (81, 82) having a respective network means (88, 89) connected thereto and providing said respective output signals to the trigger circuits.

16. System according to claim 13, wherein the trigger stage (81) comprises an operational amplifier (95).

17. System according to claim 13, wherein the transmission speed generating means (25) comprises a transducer providing an output signal having a frequency representative of vehicle or transmission output speed;

and a frequency-voltage converter circuit is provided, including a pulse generating circuit (117) providing pulses representative of the frequency of the output from said transducer, an inverter (118) connected to said pulse generating means and providing inverted pulses, and a low-pass filter (123) connected to the inverter to provide an output which drops with increasing speed of the transmission, represented by increasing frequency generated by said generator (25).

18. System according to claim 17, wherein the inverter (118) comprises an output voltage divider (121, 122).

19. System according to claim 13, wherein a kickdown controller (49) is provided engaged by said engine controller (51) and commanding instant downshifting;

said system further comprising circuit means (113') connecting the output of that one of the network means (88) to the single trigger stage (81) which is connected to the engine loading signal, and normally effective to control upshifting only to override said switch means (106).

20. System according to claim 14, wherein pairs of respective network means (88, 89) are provided, one pair each being associated with one of the trigger stages (81, 82);

said system further comprising additional pairs of network means (88, 89) having network parameters corresponding to different operating conditions than said first-mentioned pairs of network means;

and a switch (124) selectively engageable to place a selected one of said pairs of network means in circuit with a selected trigger stage (81, 82).

21. System according to claim 20, wherein a kickdown controller (49) is provided engaged by said engine controller (51) and commanding instant downshifting, wherein said kick-down controller is connected to and controls operation of said change-over switch (124) to place a selected network means having circuit parameters representative of control of the engine for high power to a selected respective trigger stage.

22. System according to claim 13, wherein the trigger stage, or trigger stages, comprises an operational amplifier (95) having said speed signal applied thereto, said speed signal having a dropping characteristic with increasing speed of the transmission and said operational amplifier (95) being coupled through separate diodes (91, 93) to the outputs of said network means (88, 89);

and said switching means comprising a further feedback diode (106) connected from the output of said operational amplifier (95) to the output of that one of the network means (89) which controls downshifting (2nd to 1st).

23. System according to claim 22, further comprising a short-circuiting control circuit including a transistor (92) connected to that terminal of the operational amplifier which has the coupling diodes (91, 93) from the outputs of said network means (88, 89) connected thereto;

a gear selector (26) being provided, the control electrode of the transistor (92) being connectable by said gear selector (26) to a signal to selectively block said transistor or render said transistor conductive to prevent up-shifting signals being applied to said operational amplifier (95) and provide for maintaining the gear transmission in a gear selected by the selector (26);

and circuit means (109, 108, 111) providing a clamping voltage to said transistor and operational amplifier (95).

24. System according to claim 1, further comprising (FIG. 13) a safety supervisory circuit including a switch (159) connected between the supply source (31) of electric potential for the system and the components of the system;

a relay coil (146) controlling said switch, and a transistor (148) in series with the relay coil (146);

and a self-holding circuit supplied directly from the battery (31) connected to the base of the transistor to cause the transistor to change to blocked conditions when the self-holding circuit is energized;

and control circuit means connected to the system responsive to malfunction in the system energizing said self-holding circuit to change the transistor to blocked condition and cause drop-out of the relay switch (159) and hence disconnection of power supply to the system upon malfunction, or burn-out of said transistor (148).

25. System according to claim 24, further comprising speed transducer means (84) connected to the engine of the vehicle, and providing said malfunction signal to the self-holding circuit.

26. System according to claim 25, further comprising a frequency-voltage converter circuit (85) and a trigger circuit (86) connected to the converter circuit and providing a circuit connection from said speed transducer means (84) to the self-holding circuit, the trigger circuit being responsive to a signal level derived from the converter circuit representative of excessive speed of the engine.

27. System according to claim 25, wherein the internal combustion engine has an ignition system;

and wherein the speed transducer means comprises the spark generation circuit for the ignition system of said internal combustion engine.

28. System according to claim 2, further comprising at least one connecting network, forming a coupling network (38) having at least one of said signals applied thereto, said coupling network forming part of, or being connected to said separate control means and modifying the signal applied thereto in accordance with the transfer characteristic of said network, wherein said connecting network comprises (FIG. 11) a resistance bridge network having two arms (129, 131) of the bridge connected to a source of supply, one other arm (133) connected to ground and the remaining arm (134) connected to the kickdown controller (49), the diagonal points between said second and third arms (131, 133) and said first and fourth arms (129, 134) being cross-connected by a resistor (132), the load transducer being coupled through a resistor (127) to the junction of said first and fourth arms, said junction also forming the output of said circuit.

29. System according to claim 1, wherein the engine loading transducer means comprises a series circuit formed of a fixed resistor and a variable resistor (126), the resistance value of said variable resistor (126) being controlled by the position of said engine controller (28, 51).

30. System according to claim 22, wherein (FIG. 12) the selector (26) has electrical contacts associated therewith, the selector position corresponding to "reverse" (R) being a terminal which, when energized, provides a signal different from ground or chassis voltage of the supply to which the system is connected;

further comprising a reverse gear operating and control circuit which comprises a coupling element (136) connecting the "reverse" terminal and hence "reverse" signal to the direct terminal of the operational amplifier (95) of said single trigger stage (81);

an additional operational amplifier (139) is provided, the inverting input of the additional operational amplifier (139) having a reference voltage applied thereto, the direct input of the operational amplifier having said speed signal applied thereto which is also connected to the operational amplifier (95) of said single trigger stage;

a feedback diode (144) from the output of said additional operational amplifier (139) to the direct input thereof;

and a coupling circuit (143) coupling the output of said additional operational amplifier (139) to the inverting input of the operational amplifier (95) of said single trigger stage (81).

31. System according to claim 1, wherein (FIG. 12) said separate control means includes an operational amplifier (95);

and a damping circuit connected to both the direct and inverting inputs of said operational amplifier, said damping circuit comprising a resistor (98, 99), each, connected to said direct and inverting inputs, and a capacitor (96) connected across said resistors at the terminals of said operational amplifier, the inputs to said operational amplifier being connected to the terminals of said resistors remote from the connection to the capacitor.

32. System according to claim 5, wherein (FIGS. 3 and 15) a pair of bistable trigger stages (53, 56; 54, 55) are combined in a single circuit, each trigger stage of a pair controlling, respectively, up-shifting and down-shifting between adjacent gears, said combined circuit comprising a switching transistor (171) and a thyristor (172), the emitter-collector current path of the transistor (171) and the main current path of the thyristor (172) being connected in series;

a load resistor (167) connected in series with said series connected switching transistor (171) and thyristor (172);

a pair of comparators (158, 159), each connected to said speed signal and additionally each connected to a signal derived from said engine loading signal, one comparator being connected to and controlling conduction of said transistor and the other comparator being connected to and controlling conduction of said thyristor, and relative signal values being applied to said comparators being different to provide for hysteresis of conduction of said transistor and thyristor, and turn-off of the thyristor independently of control of conduction of the transistor (171).

* * * * *